United States Patent
Park et al.

(10) Patent No.: US 12,107,442 B2
(45) Date of Patent: Oct. 1, 2024

(54) COIL INCLUDING STRUCTURE FOR MINIMIZING INFLUENCE THEREON BY METAL MATERIAL AND RESONANT CIRCUIT INCLUDING SAME

(71) Applicant: Samsung Electronics Co., Ltd., Gyeonggi-do (KR)

(72) Inventors: Jaehyun Park, Gyeonggi-do (KR); Beomwoo Gu, Gyeonggi-do (KR); Jaeseok Park, Gyeonggi-do (KR); Sungku Yeo, Gyeonggi-do (KR); Youngho Ryu, Gyeonggi-do (KR); Bohwan Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 80 days.

(21) Appl. No.: 17/667,964

(22) Filed: Feb. 9, 2022

(65) Prior Publication Data

US 2022/0255366 A1 Aug. 11, 2022

Related U.S. Application Data

(63) Continuation of application No. PCT/KR2022/001040, filed on Jan. 20, 2022.

(30) Foreign Application Priority Data

Feb. 9, 2021 (KR) .................. 10-2021-0018413

(51) Int. Cl.
*H02J 50/70* (2016.01)
*H01F 27/26* (2006.01)
(Continued)

(52) U.S. Cl.
CPC ............ *H02J 50/70* (2016.02); *H01F 27/263* (2013.01); *H02J 7/02* (2013.01); *H02J 50/12* (2016.02)

(58) Field of Classification Search
CPC ... H02J 50/70; H02J 7/02; H02J 50/12; H01F 27/263; H01F 27/28; H01F 27/346; H01F 38/14

See application file for complete search history.

(56) References Cited

U.S. PATENT DOCUMENTS

| 2003/0062794 A1* | 4/2003 | Scheible | ................. | H02J 50/40 310/179 |
| 2003/0062980 A1* | 4/2003 | Scheible | ................. | H01F 38/14 336/170 |

(Continued)

FOREIGN PATENT DOCUMENTS

| CN | 112104102 | 12/2020 |
| KR | 10-1228566 | 2/2013 |

(Continued)

OTHER PUBLICATIONS

International Search Report dated Apr. 28, 2022 issued in counterpart application No. PCT/KR2022/001040, 10 pages.

*Primary Examiner* — Daniel Cavallari
*Assistant Examiner* — Brian K Baxter
(74) *Attorney, Agent, or Firm* — The Farrell Law Firm, P.C.

(57) ABSTRACT

Disclosed is a coil including a first conductor disposed on a first plane, a second conductor disposed on a second plane different from the first plane, and including a first end electrically connected to a first end of the first conductor, and a second end positioned near a second end of the first conductor, and a third conductor disposed on the first plane, and including a first end electrically connected to the second end of the second conductor, and a second end positioned near the first end of the second conductor, wherein a pattern of the first conductor connecting the first end of the first conductor from the second end of the first conductor is in a clockwise or counterclockwise direction when the first plane (Continued)

is viewed from a first side, and wherein a pattern of the third conductor connecting the second end of the third conductor from the first end of the third conductor is in a direction opposite to the direction of the pattern of the first conductor when the first plane is viewed from the first side.

18 Claims, 10 Drawing Sheets

(51) Int. Cl.
*H02J 7/02* (2016.01)
*H02J 50/12* (2016.01)

(56) References Cited

U.S. PATENT DOCUMENTS

| | | |
|---|---|---|
| 2006/0238930 A1 | 10/2006 | Baarman et al. |
| 2007/0222542 A1 | 9/2007 | Joannopoulos et al. |
| 2013/0300205 A1 | 11/2013 | Tzanidis et al. |
| 2014/0184155 A1 | 7/2014 | Cha |
| 2014/0191584 A1* | 7/2014 | Kato ................... H01F 27/2871 |
| | | 307/104 |
| 2015/0015082 A1* | 1/2015 | Kanagawa .......... H01F 27/2871 |
| | | 307/104 |
| 2015/0022145 A1 | 1/2015 | Kim et al. |
| 2015/0214788 A1* | 7/2015 | Hosotani ................. H02J 50/12 |
| | | 307/104 |
| 2015/0311728 A1 | 10/2015 | Yun et al. |
| 2016/0189848 A1 | 6/2016 | Nam |
| 2017/0148567 A1* | 5/2017 | Rosenfeld .............. G01N 27/82 |
| 2017/0155286 A1 | 6/2017 | Kato |
| 2018/0342896 A1* | 11/2018 | Zhang .................... H02J 50/12 |
| 2019/0157909 A1 | 5/2019 | Akahori |
| 2020/0280214 A1 | 9/2020 | Kurs et al. |
| 2021/0293966 A1* | 9/2021 | Sakai ..................... H01L 31/02 |
| 2022/0060057 A1 | 2/2022 | Hao et al. |
| 2023/0075393 A1* | 3/2023 | Shi ......................... H02J 50/80 |

FOREIGN PATENT DOCUMENTS

| | | |
|---|---|---|
| KR | 10-1397668 | 5/2014 |
| KR | 1020160078186 | 7/2016 |
| KR | 1020200131452 | 11/2020 |

* cited by examiner

COIL INCLUDING STRUCTURE FOR MINIMIZING INFLUENCE THEREON BY METAL MATERIAL AND RESONANT CIRCUIT INCLUDING SAME

CROSS-REFERENCE TO RELATED APPLICATIONS

This application is a Bypass Continuation Application of International Application No. PCT/KR2022/001040, which was filed on Jan. 20, 2022, and is based on and claims priority under 35 U.S.C. § 119 to Korean Patent Application No. 10-2021-0018413, which was filed in the Korean Intellectual Property Office on Feb. 9, 2021, the entire disclosure of each of which is incorporated herein by reference.

BACKGROUND

1. Field

The disclosure relates generally to a wireless device, and more particularly, to a coil including a structure for minimizing influence of a metal material in a wireless device, and a resonant circuit including the same.

2. Description of Related Art

Recent development of wireless charging technologies has been proceeded by research regarding methods for supplying power to various electronic devices from a single charging device, thereby charging the electronic devices.

Such wireless charging technologies utilize wireless power transmission/reception and provide a system in which an electronic device is not connected to a separate charging connector, but is placed on a charging pad, thereby automatically charging the battery.

Such wireless charging technologies include an electromagnetic induction type using coils, a resonance type using resonance, and a radio frequency (RF)/micro wave radiation type in which electric energy is converted into microwaves, which are then transferred.

A power transmission method based on wireless charging transmits power between a first coil of a transmitting end and a second coil of a receiving end. The transmitting end generates a magnetic field, and the receiving end generates energy as an electric current is induced or resonated according to a change in the magnetic field.

Wireless charging technologies using the electromagnetic induction type or the magnetic resonance type have recently been widespread in connection with electronic devices, such as smartphones. If a wireless power transmitting unit (PTU) (for example, wireless charging pad) and a wireless power receiving unit (PRU) (for example, smartphone) contact or approach within a distance, the battery of the PRU may be changed by electromagnetic induction or electromagnetic resonance between the transmitting coil of the PTU and the receiving coil of the PRU.

A wireless PTU may generate an induced magnetic field through a resonator by using the magnetic resonance type, which may generate induced electromotive force and induced current in the wireless PRU, thereby wirelessly transmitting power to the wireless PRU.

The wireless PTU may transmit power to the wireless PRU in various environments, such as a metal material including a desk having an iron-made frame. If the wireless PTU generates a magnetic field in the periphery in order to wireless transmit power, the magnetic field generated in the periphery generates an electric current (for example, eddy current) in the metal material positioned in the periphery, which may generate a magnetic field from the metal material. In addition, in the resonance type in which power can be transferred to a longer distance than the induction type, a larger current and magnetic field may be generated from the metal material. The magnetic field generated from the metal material may affect the magnetic field generated by the wireless PTU, thereby affecting resonant circuit characteristics such as inductance, resonant frequency, and/or quality factor (Q factor). As another example, the wireless PTU may include elements made of a metal material, such as an impedance matching circuit inside the housing, and a magnetic field may also be generated from such elements made of a metal material, thereby causing a deterioration of resonant circuit characteristics.

As such, there is a need in the art for a method and apparatus that minimize a change in resonant circuit characteristics caused by the peripheral metal material, thereby improving the charging of the wireless device.

SUMMARY

The disclosure has been made to address at least the above-mentioned problems and/or disadvantages and to provide at least the advantages described below.

Accordingly, an aspect of the disclosure is to provide a coil including conductors formed by connection patterns opposite to each other for counterbalancing purposes, such that the magnetic field is generated in a direction that minimizes influence on the peripheral metal material.

Another aspect of the disclosure is to provide a coil configured to generate magnetic fields that counterbalance each other in a direction in which a metal material positioned on the periphery faces, based on an environment in which a wireless PTU may be disposed, thereby providing stable power to the wireless PRU.

Another aspect of the disclosure is to provide a resonant circuit including the above-described coil.

In accordance with an aspect of the disclosure, a coil may include a first conductor disposed on a first plane, a second conductor disposed on a second plane different from the first plane, and including a first end electrically connected to a first end of the first conductor, and a second end positioned near a second end of the first conductor, and a third conductor disposed on the first plane, and including a first end electrically connected to the second end of the second conductor, and a second end positioned near the first end of the second conductor, wherein a pattern of the first conductor connecting the first end of the first conductor from the second end of the first conductor is in a clockwise or counterclockwise direction when the first plane is viewed from a first side, and wherein a pattern of the third conductor connecting the second end of the third conductor from the first end of the third conductor is in a direction opposite to the direction of the pattern of the first conductor when the first plane is viewed from the first side.

In accordance with another aspect of the disclosure, a coil may include a first conductor disposed on a first plane, a second conductor disposed on a second plane different from the first plane, and electrically connected to the first conductor, and a third conductor disposed on the first plane, and electrically connected to the first conductor and the second conductor, wherein the first conductor is configured to generate a first magnetic field in a first direction with respect to an inner side of the first conductor and the third conductor, wherein the second conductor is configured to generate a second magnetic field in a third direction different from a second direction opposite to the first direction and the first direction, with respect to the inner side, and wherein the third conductor is configured to generate a third magnetic field in the second direction with respect to the inner side.

In accordance with another aspect of the disclosure, a resonant circuit may include a coil and at least one capacitor, wherein the coil includes a first conductor disposed on a first plane, a second conductor disposed on a second plane different from the first plane, and including a first end electrically connected to a first end of the first conductor, and a second end positioned near a second end of the first conductor, and a third conductor disposed on the first plane, and including a first end electrically connected to the second end of the second conductor, and a second end positioned near the first end of the second conductor, wherein a pattern of the first conductor connecting the first end of the first conductor from the second end of the first conductor includes a pattern in a clockwise or counterclockwise direction when the first plane is viewed from one side, wherein a pattern of at least one third conductor connecting the second end of the third conductor from the first end of the third conductor includes a pattern in a direction opposite to the pattern of the first conductor when the first plane is viewed from the one side, and wherein the at least one capacitor is connected to at least one of the first conductor, the second conductor, or the third conductor.

In accordance with an aspect of the disclosure, a less magnetic field (for example, effective magnetic field) is generated in one direction (for example, direction in which a metal material positioned on the periphery faces), thereby minimizing a change in resonant circuit characteristics caused by the peripheral metal material.

In accordance with another aspect of the disclosure, a magnetic field may be generated in a direction that minimizes influence on the peripheral metal material, thereby providing stable power to the wireless PRU.

Various advantageous effects exhibited by the disclosure are not limited to the above-mentioned advantageous effects.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
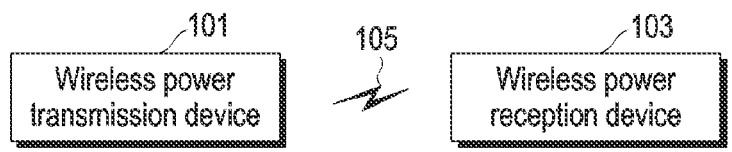
FIG. 1 illustrates a wireless power transmission device and a wireless power reception device, according to an embodiment.

Hereinafter, embodiments of the disclosure will be described in detail with reference to the accompanying drawings. It should be noted that, in the drawings, the same or like elements are designated by the same or like reference signs as much as possible. In the following description and drawings, a detailed description of known functions or configurations that may make the subject matter of the disclosure unnecessarily unclear will be omitted.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 illustrates a wireless power transmission device 101 and a wireless power reception device 103, according to an embodiment.

The wireless power transmission device 101 may wirelessly transmit power 105 to the wireless power reception device 103.

For example, the wireless power transmission device 101 may transmit the power 105 according to an inductive manner. When the wireless power transmission device 101 uses the inductive manner, the wireless power transmission device 101 may include a power source, a direct current (DC)-alternating current (AC) conversion circuit (or an amplifier circuit), an impedance matching circuit, at least one capacitor, at least one coil, and a communication modulation/demodulation circuit, for example. The at least one capacitor may configure a resonant circuit together with the at least one coil. The wireless power transmission device 101 may be implemented in a manner defined in wireless power consortium (WPC) standards (or Qi standards).

For example, the wireless power transmission device 101 may transmit the power 105 according to a resonant manner. When using the resonant manner, the wireless power transmission device 101 may include a power source, a DC-AC conversion circuit (or an amplifier circuit), an impedance matching circuit, at least one capacitor, at least one coil, an out-band communication circuit (e.g., a Bluetooth™ low energy (BLE) communication circuit), etc. The at least one capacitor and the at least one coil may configure a resonant circuit. The wireless power transmission device 101 may be implemented in a manner defined in Alliance For Wireless Power (A4WP) standards (or Air Fuel Alliance (AFA) standards). The wireless power transmission device 101 may include a coil capable of generating an induced magnetic field according to the resonant manner or the inductive manner when current (e.g., alternating current) flows.

A process in which the wireless power transmission device 101 generates a magnetic field through a coil may be expressed as outputting wireless power, and a process in which an induced electromotive force is generated in the wireless power reception device 103 based on the generated magnetic field may be expressed as wireless reception of the power 105. Through such a process, it may be expressed that the wireless power transmission device 101 wirelessly transmits the power 105 to the wireless power reception device 103. In addition, the wireless power reception device 103 may include a coil in which an induced electromotive force is generated by a formed ambient magnetic field having a magnitude changing according to time. A process in which as an induced electromotive force is generated in the coil of the wireless power reception device 103, alternating current is output from the coil or alternating current voltage is applied to the coil may be expressed as wireless reception of the power 105 by the wireless power reception device 103.

For example, the wireless power transmission device 101 may transmit power according to an electromagnetic wave manner, in which the wireless power transmission device 101 may include a power source, a DC-AC conversion circuit (or an amplifier circuit), a distribution circuit, a phase shifter, an antenna array for power transmission including a plurality of antennas (e.g., a patch antenna, a dipole antenna, and/or a monopole antenna), and an out-band communication circuit (e.g., a BLE communication module). Each of the plurality of antennas may form an RE wave. The wireless power transmission device 101 may perform beam-forming by adjusting a phase and/or an amplitude of an electrical signal input for each antenna. The wireless power reception device 103 may include an antenna capable of outputting current by using a formed ambient RF wave. A process in which the wireless power transmission device 101 forms an RF wave may be expressed as wireless transmission of the power 105 by the wireless power transmission device 101. A process in which the wireless power reception device 103 outputs current from an antenna by using an RF wave may be expressed as wireless reception of the power 105 by the wireless power reception device 103.

The wireless power transmission device 101 may communicate with the wireless power reception device 103.

For example, the wireless power transmission device 101 may communicate with the wireless power reception device 103 according to an in-band scheme. The wireless power transmission device 101 or the wireless power reception device 103 may change a load (or impedance) of data to be transmitted according to an on/off keying modulation scheme. The wireless power transmission device 101 or the wireless power reception device 103 may determine data transmitted from a counterpart device by measuring a load change (or impedance change), based on a magnitude change of current, voltage, or power of a coil.

For example, the wireless power transmission device 101 may communicate with the wireless power reception device 103 according to an out-band scheme. The wireless power transmission device 101 or the wireless power reception device 103 may transmit or receive data by using a communication circuit (e.g., a BLE communication module) provided separately from the coil or a patch antenna. The wireless power transmission device 101 may transmit media data, and according to implementation, a plurality of different communication circuits (e.g., a BLE communication module, a wireless fidelity (Wi-Fi) module, and a 60 gigahertz Wi-Fi (Wi-Gig) module) may transmit or receive media data and a wireless power transmission reception control signal, respectively.

The wireless power transmission device 101 may transmit the power 105 to two or more wireless power reception devices and/or communicate with two or more wireless power reception devices.

Figure 2A:
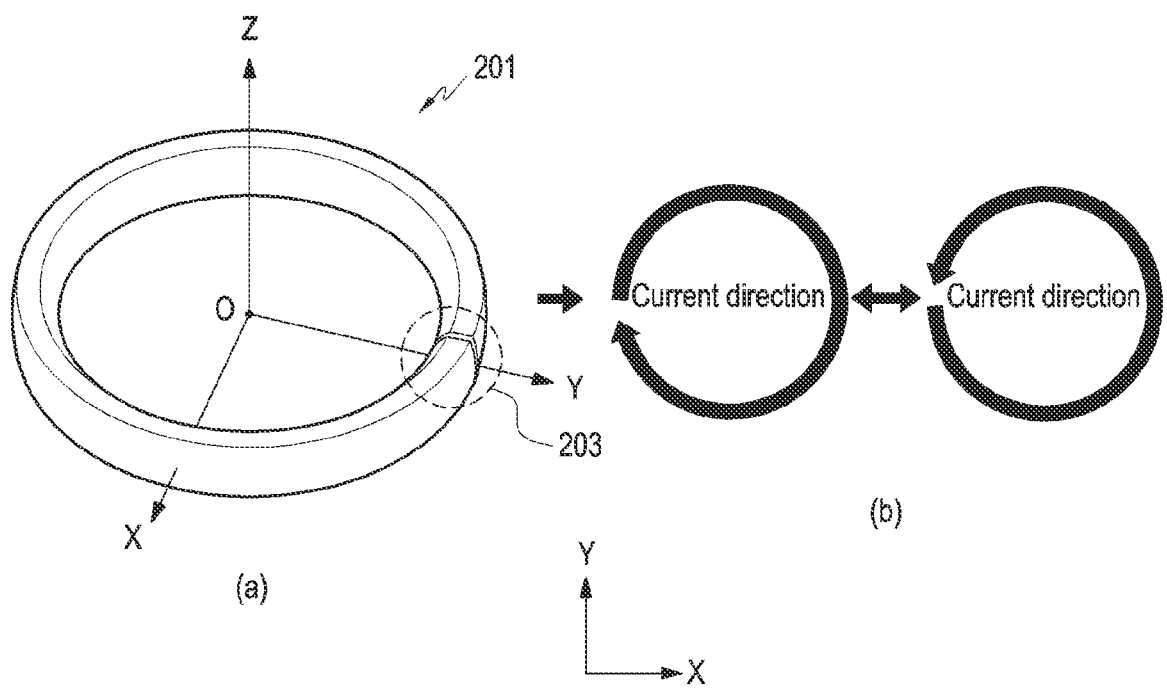
FIG. 2A is a perspective view of a resonant circuit to which the disclosure is applied.

FIG. 2A is a perspective view of a resonant circuit 201 to which the disclosure is applied.

The resonant circuit 201 which may be included in a wireless power transmission device may be configured as a circular shaped structure or, in section (a) of FIG. 2A, an annular shaped structure wound multiple times. A slit 203 configured to divide the resonant circuit 201 may be disposed in at least a part of the resonant circuit 201, and the slit 203 may function as a capacitor. At least one capacitor may be connected to both ends of the slit 203. At least one component (e.g., an impedance matching circuit and/or an amplifier circuit) of the wireless power transmission device may be connected through the both ends of the slit 203.

The resonant circuit 201 may receive alternating current through the both ends of the slit 203, and/or may receive alternating current power from a feeding coil electromagnetically coupled to the resonant circuit 201. For example, current and electromotive force may be induced in the resonant circuit 201 by a magnetic field generated from the feeding coil. In section (b) of FIG. 2A, in the resonant circuit 201, alternating current flows with reference to an XY plane, and the current alternately flows in a clockwise or counterclockwise direction along a circular coil shape.

Figure 2B:
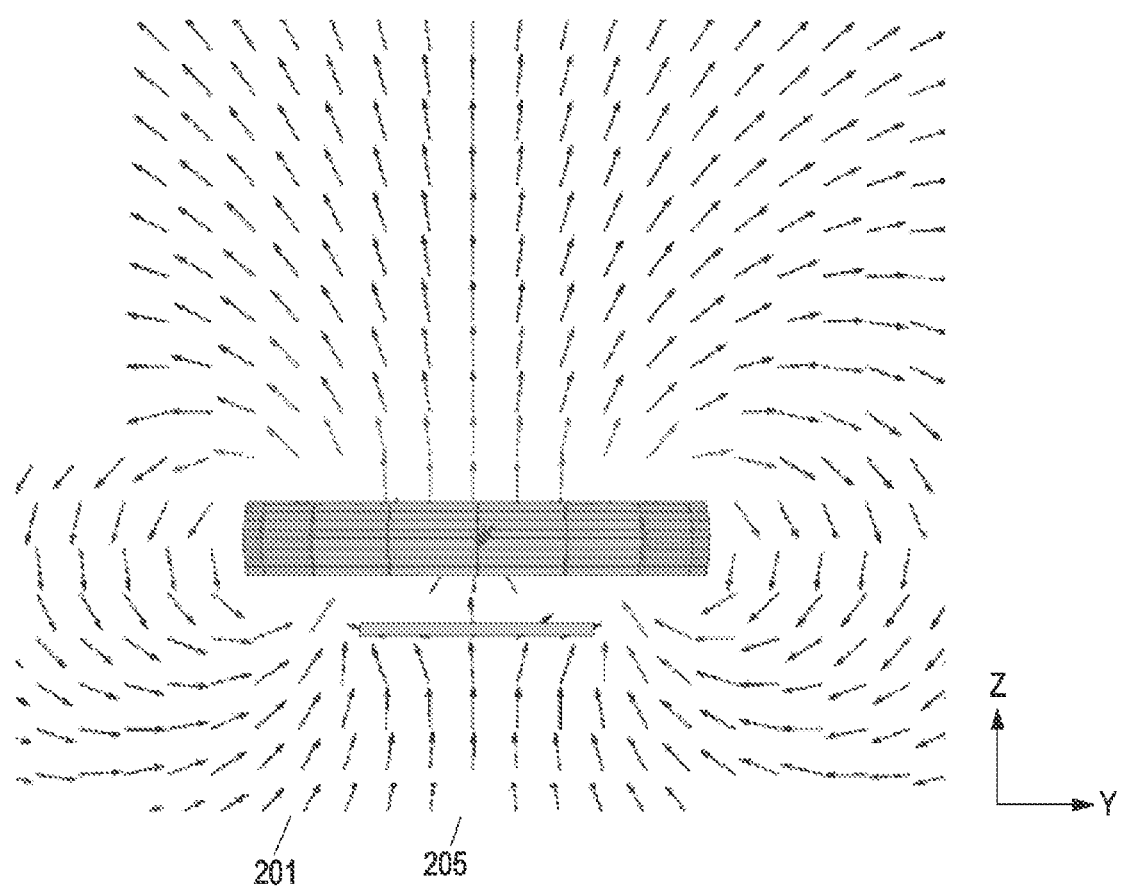
FIG. 2B illustrates a magnetic field generated from a resonant circuit to which the disclosure is applied.

FIG. 2B illustrates a magnetic field generated from the resonant circuit 201 to which the disclosure is applied.

The "arrows" shown in FIG. 2B represent magnetic force lines of a magnetic field (e.g., H-field) generated from the resonant circuit 201 based on the flow of current in the resonant circuit 201 in a counterclockwise direction at a specific time point, from a viewpoint in which the resonant circuit 201 is viewed from one direction (e.g., a direction).

Reference numeral 205 denotes a metal material positioned around the resonant circuit 201. For example, a metal material 205 may be a metal material positioned outside (e.g., a surrounding environment where the wireless power transmission device is placed) the wireless power transmission device including the resonant circuit 201, or a metal material (e.g., a circuit element, a metal housing case, etc.) positioned inside the wireless power transmission device. In FIG. 2B, for convenience of description, it is assumed that the metal material 205 is positioned under (e.g., in a −Z direction) the resonant circuit 201 so as to be horizontal to the resonant circuit 201.

As shown in FIG. 2B, at least a part of a magnetic field generated from the resonant circuit 201 passes through a conductor such as the metal material 205, and as a result, eddy current (e.g., induced current based on Faraday's law) may be induced in the metal material 205. Based on the eddy current induced in the metal material 205, a magnetic field may be generated from the metal material 205. The magnetic field is generated from the metal material 205 in a direction which cancels out at least a part of the magnetic field generated from the resonant circuit 201, and a magnetic flux magnetic flux interlinkage) passing through the resonant circuit 201 (e.g., a coil) may decrease. In other words, an effective magnetic flux passing through the resonant circuit 201 (e.g., a coil) may decrease. Accordingly, an equivalent inductance of an equivalent circuit including the metal material 205 and the resonant circuit 201 may decrease. Based on the decrease in the equivalent inductance of the resonant circuit 201, a resonant frequency of the resonant circuit 201 may be changed. Based on a decrease in the equivalent inductance of the resonant circuit 201 and/or an increase in equivalent resistance by a resistance component included in the metal material 205 itself, a Q-factor of the resonant circuit 201 may decrease.

Figure 2C:
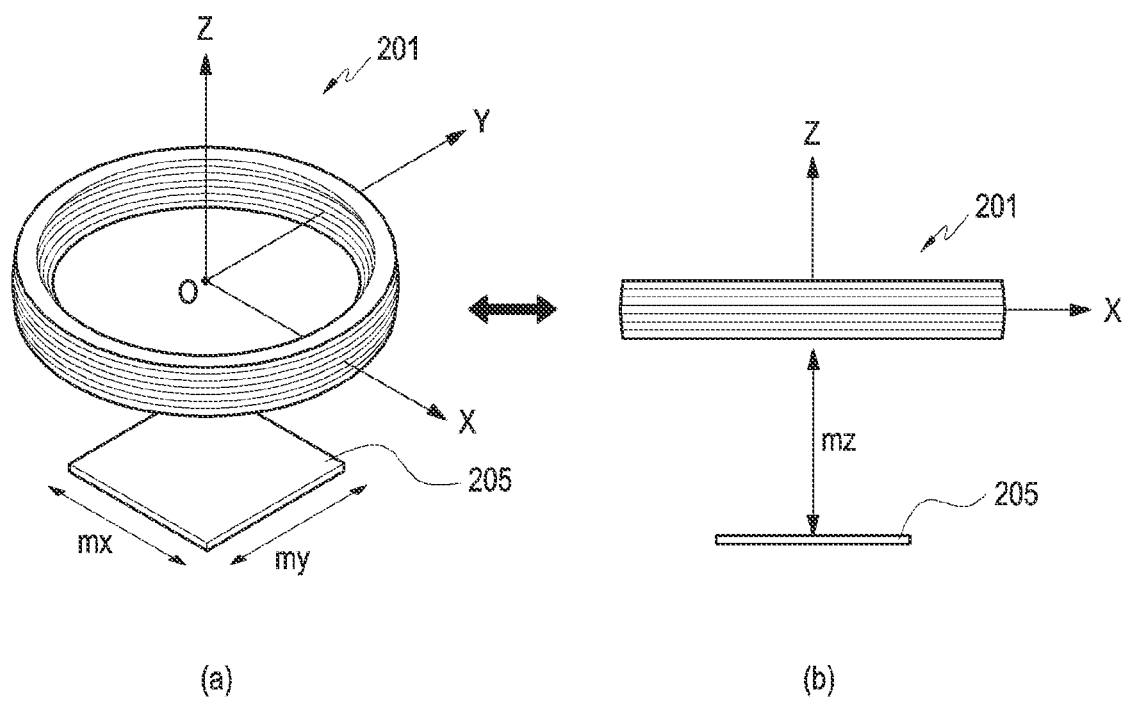
FIG. 2C illustrates a change in characteristics of a resonant circuit when a metal material is positioned around the resonant circuit to which the disclosure is applied.

FIG. 2C illustrates a change in characteristics of the resonant circuit 201 when the metal material 205 is positioned around the resonant circuit 201 to which the disclosure is applied.

Referring to section (a) of FIG. 2C, for convenience of description, it is assumed that the metal material 205 has a square or rectangular shape having a length mx in an x-axis direction and a length my in a y-axis direction. The mz shown in section (h) of FIG. 2C represents a distance in a z-axis direction between the resonant circuit 201 in a lower side surface and the metal material 205 in an upper side surface.

For example, when the metal material 205 with mx=10 millimeters (mm) and my=10 mm is positioned at a point with mz=20 mm, a simulation result for changes in the measured equivalent inductance L, resonant frequency $f_r$, and Q factor of the resonant circuit 201 may be shown in Table 1 below. When the metal material 205 is not existed, it is assumed that the resonant frequency of the resonant circuit 201 is 6.78 megahertz (MHz) and the Q factor thereof is 1300. It is assumed that the metal material 205 is aluminum.

TABLE 1

|  | Inductance change (ΔL) | Resonant frequency change (Δf$_r$) | Q factor change (ΔQ) |
| --- | --- | --- | --- |
| Degree of change | −6.8 [%] | +241 [kHz] | −265 |

Referring to Table 1, as the metal material 205 is positioned around the resonant circuit 201, it can be identified that the inductance L decreases, the resonant frequency $$\left(f_r = \frac{1}{2\pi\sqrt{LC}}\right)$$

increases, and the Q factor $$\left(Q = \frac{w \cdot L}{R}\right)$$

(where R is an equivalent resistance value including the resonant circuit 201 and the metal material 205) decreases, so that the Q factor characteristics of the resonant circuit 201 deteriorate. Referring to FIG. 2B together with Table 1, if a magnetic field generated from the resonant circuit 201 affects the metal material 205, eddy current is generated in the metal material 205, and thus the characteristics of the resonant circuit 201 may be changed. If an area (e.g., mx·my) of the metal material 205 is larger or a distance mz between the resonant circuit 201 and the metal material 205 is smaller, the above-described Q factor characteristics of the resonant circuit 201 may further deteriorate.

If the metal material 205 is iron, under the same assumption as the above-described assumption, a simulation result for changes in the measured equivalent inductance L and Q factor of the resonant circuit 201 may be shown in Table 2 below.

TABLE 2

|  | Inductance change (ΔL) | Q factor change (ΔQ) |
| --- | --- | --- |
| Degree of change | −5.653 [%] | −1213 |

In the resonant circuit 201, a magnetic shielding material or a magnetic shielding sheet (e.g., ferrite) may be disposed on a plane parallel to air XY plane. If the metal material 205 is iron, under the same assumption as the above-described assumption, a simulation result for changes in the measured equivalent inductance L and Q factor of the resonant circuit 201 may be shown in Table 3 below.

TABLE 3

|  | Inductance change (ΔL) | Q factor change (Δ) |
| --- | --- | --- |
| Degree of change | −1.32 [%] | −974 |

Figure 3:
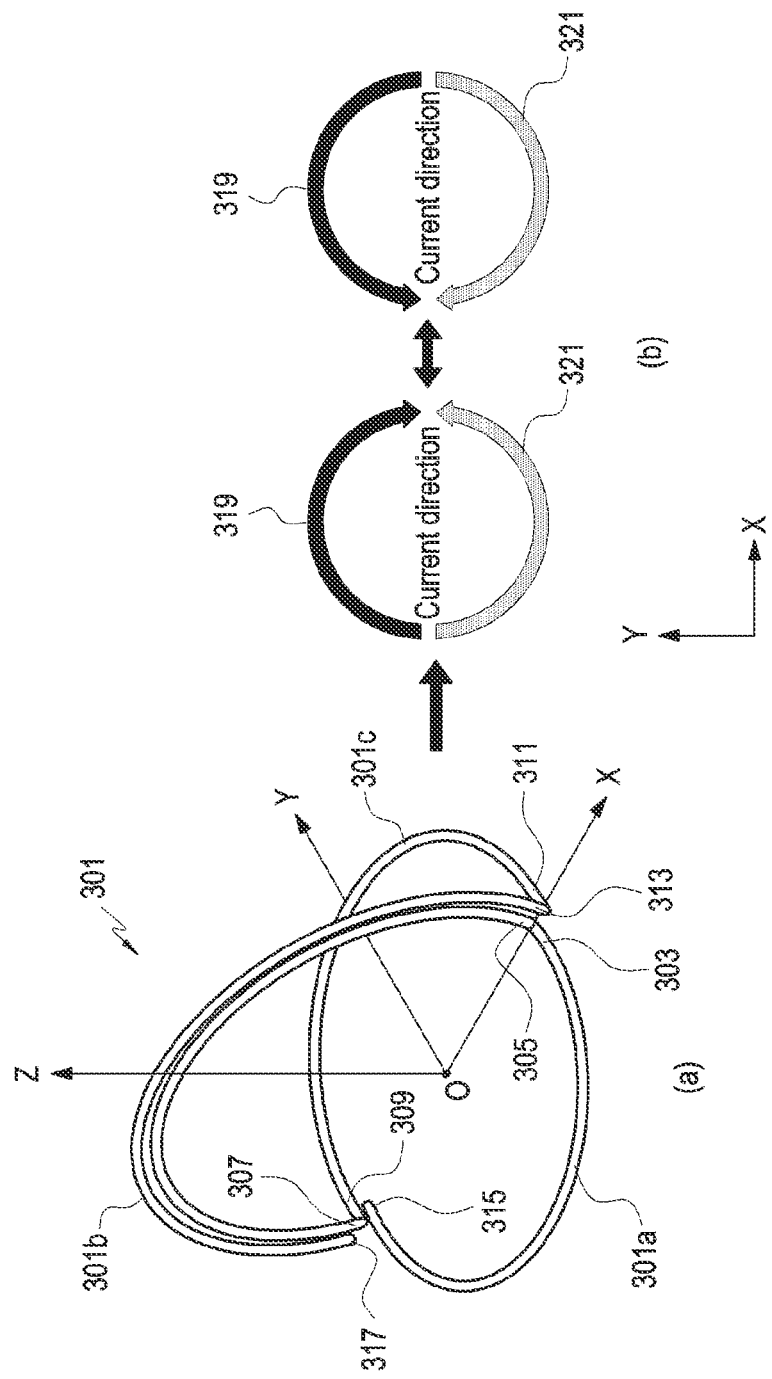
FIG. 3 illustrates an example of a coil, according to an embodiment.

FIG. 3 illustrates an example of a coil 301, according to an embodiment.

Referring to section (a) of FIG. 3, part of the coil 301 is formed on an XY plane and the other part thereof is formed on a ZX plane. In the coil 301, a part corresponding to a −Y direction is described as a first conductor 301a herein, a part corresponding to a +Z direction is described as a second conductor 301b, and a part corresponding to a +Y direction is described as a third conductor 301c.

A first end 303 of the first conductor 301a may be connected to a first end 305 of the second conductor 301b. A second end 307 of the second conductor 301b may be connected to a first end 309 of the third conductor 301c, The second end 307 of the second conductor 301b may be positioned near a second end 315 of the first conductor 301a. A second end 311 of the third conductor 301c may be connected to a third end 313 of the second conductor 301b. The second end 311 of the third conductor 301c may be positioned near the first end 305 of the second conductor 301b.

At least one component (e.g., at least one capacitor, an impedance matching circuit, and/or an amplifier circuit) of a wireless power transmission device 101 may be connected to the second end 315 of the first conductor 301a and a fourth end 317 of the second conductor 301b.

Alternatively, the second end 311 of the third conductor 301c may not be connected to the third end 313 of the second conductor 301b, and a pattern connecting the fourth end 317 from the third end 313 of the second conductor 301b may be omitted. In this case, at least one component (e.g., at least one capacitor, an impedance matching circuit, and/or an amplifier circuit) of the wireless power transmission device 101 may be connected to the second end 315 of the first conductor 3011a and the second end 311 of the third conductor 301c.

The first conductor 301a and/or the third conductor 301c may be configured to be horizontal to the XY plane, as shown in section (a) of FIG. 3. The first conductor 301a and/or the third conductor 301c may be configured not to be horizontal to the XY plane. For example, the first conductor 301a and the third conductor 301c may be configured to form a predetermined angle with each other.

As shown in section (a) of FIG. 3, the first conductor 301a and/or the third conductor 301c may be configured to have a shape spaced a predetermined distance apart from a center C) of an inner side of the first conductor 301a and the third conductor 301c. For example, the first conductor 301a and/or the third conductor 3011c may be configured to have a semicircular shape having a specified curvature. Alternatively, the first conductor 301a and/or the third conductor 301c may be configured to have a quadrangle shape or another r shape.

As shown in section (a) of FIG. 3, the first conductor 301a and the third conductor 301c may be configured to have a shape substantially symmetrical to each other with respect to the X axis of the inner side of the first conductor 301a and the third conductor 301c, but the first conductor 301a and the third conductor 310c may be implemented in an asymmetric shape.

As shown in section (a) of FIG. 3, the second conductor 301b may be configured to be horizontal to the ZX plane (e.g., to be perpendicular to the first conductor 301a and/or the third conductor 301c). The second conductor 301b may be configured not to be horizontal to the ZX plane. For example, the second conductor 301b may be configured to form a predetermined angle with respect to a vertical direction (e.g., the ZX plane) of the first conductor 301a and/or the third conductor 301c.

As shown in section (a) of FIG. 3, the second conductor 301b may be configured to have a shape spaced a predetermined distance apart from the center O. For example, the second conductor 301b may be configured to have a semicircular shape having a specified curvature. Alternatively, the second conductor 301b may be configured to have an arch shape, or to have a quadrangle shape or another shape.

A slit functioning as a capacitor may be configured in a part of the second conductor 301b, and will be described in more detail herein. Based on the slit being included in a part of the coil 301, the coil 301 may be used as a resonator including a capacitor and an inductor.

A pattern connecting the first end 303 of the first conductor 301a from the second end 315 of the first conductor 301a and a pattern connecting the second end 311 of the third conductor 301c from the first end 309 of the third conductor 301c may be opposite to each other. For example, when the coil 301 is viewed in a +Z direction, the pattern of the first conductor 301a may be described as a counterclockwise direction, and the pattern of the third conductor 301c may be described as a clockwise direction opposite to the counterclockwise direction. A pattern of the second conductor 301b may include a first pattern connecting the second end 307 from the first end 305 and a second pattern connecting the fourth end 317 from the third end 313.

Referring to section (b) of FIG. 3, since the above-described pattern of the first conductor 301a and the above-described pattern of the third conductor 301c are opposite to each other, a direction 321 of alternating current flowing through the first conductor 301a and a direction 319 of alternating current flowing through the third conductor 301c may be opposite to each other. For example, with reference to the XY plane, alternating current may flow through the first conductor 301a in a clockwise direction and through the second conductor 301b in a counterclockwise direction, and alternately, may flow through the first conductor 301a in the counterclockwise direction and through the second conductor 301b in the clockwise direction. Accordingly, a first magnetic field generated from the first conductor 301a and a second magnetic field generated from the third conductor 301c may be configured in opposite directions with respect to the center O. For example, when alternating current flows through the first conductor 301a in the clockwise direction and through the second conductor 301b in the counterclockwise direction at a specific time point, with respect to the center O, a direction of the first magnetic field may be described as a −Z direction, and a direction of the second magnetic field may be described as a direction. Accordingly, the first magnetic field and the second magnetic field may negate each other with respect to a point in the −Z direction.

The coil 301 may be wound multiple times. For example, the coil 301 may be wound multiple times by repeating a method for further forming a first conductor by extending (elongating) from the fourth end 317 of the second conductor 301b in a pattern direction (e.g., a counterclockwise direction on an XY plane) of the first conductor 301a, further forming a second conductor by extending in a pattern direction (e.g., a counterclockwise direction on a ZX plane) of the second conductor 301b in the vicinity of the first end 305 of the second conductor 301b and/or the first end 303 of the first conductor 301a, further forming a third conductor by extending in a pattern direction (e.g., a clockwise direction on an XY plane) of the third conductor 301c in the vicinity of the second end 307 of the second conductor 301b and/or the first end 309 of the third conductor 301c, and further forming the second conductor by extending in the pattern direction (e.g., the counterclockwise direction on an XY plane) of the second conductor 301b in the vicinity of the second end 311 of the third conductor 301c and/or the third end 313 of the second conductor 301b. Through repetition of the above-described method, first conductor 301a, second conductor 301b, and third conductor 301c may be configured in plurality, and are described in more detail later herein.

Figure 4A:
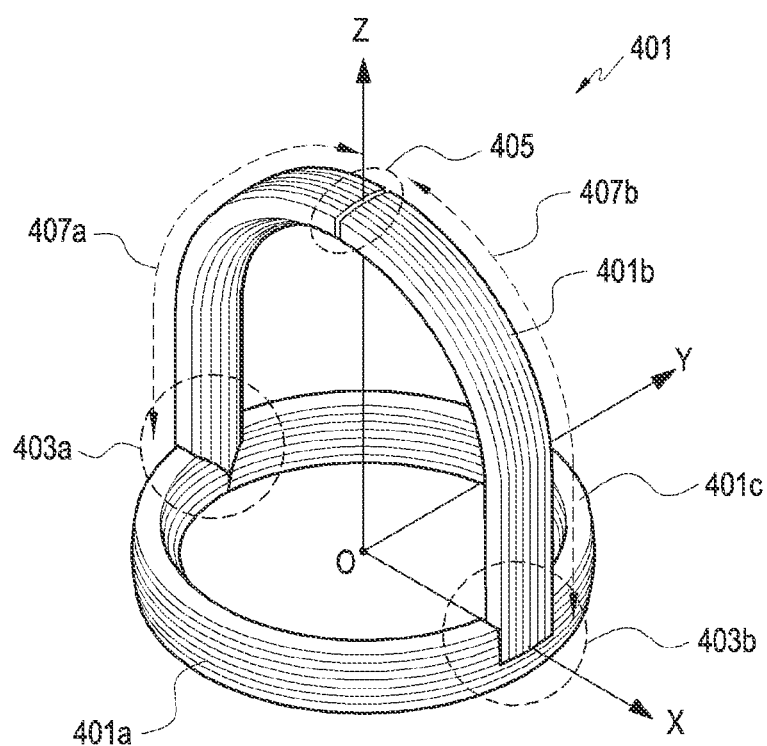
FIG. 4A illustrates an example of a coil wound multiple times, according to an embodiment.

FIG. 4A illustrates an example of a coil 401 wound multiple times, according to an embodiment.

The coil 401 may be wound multiple times as described with reference to FIG. 3. For example, referring to FIG. 3 together, the coil 401 wound multiple times may be configured, i.e., by repeating a method for further forming a first conductor by extending (elongating) from the fourth end 317 of the second conductor 301b in a pattern direction (e.g., a counterclockwise direction on an XY plane) of the first conductor 301a, further forming a second conductor by extending in a pattern direction (e.g., a counterclockwise direction on a ZX plane) of the second conductor 301b in the vicinity of the first end 305 of the second conductor 301b and/or the first end 303 of the first conductor 301a, further forming a third conductor by extending in a pattern direction (e.g., a clockwise direction on an XY plane) of the third conductor 301c in the vicinity of the second end 307 of the second conductor 301b and/or the first end 309 of the third conductor 301c, and further forming the second conductor by extending in the pattern direction (e.g., the counterclockwise direction on an XY plane) of the second conductor 301b in the vicinity of the second end 311 of the third conductor 301c and/or the third end 313 of the second conductor 301b. Herein, a pattern formed from the first end 305 to the second end 307 after forming the first conductor 301a may be described as the second conductor, and a pattern formed from the third end 313 to the fourth end 317 after forming the third conductor 301c may be described as a fourth conductor. Hereinafter, a pattern formed by extending in the pattern direction (e.g., the counterclockwise direction on an XY plane of the first conductor 301a may be described as a fifth conductor. A pattern formed by extending in the pattern direction (e.g., the counterclockwise direction on a ZX plane) of the second conductor 301b in the vicinity of the first end 305 of the second conductor 301b and/or the first end 303 of the first conductor 301a may be described as a sixth conductor. A pattern formed by extending in the pattern direction (e.g., the clockwise direction on an XY plane) of the third conductor 301c in the vicinity of the second end 307 of the second conductor 301b and/or the first end 309 of the third conductor 301c may be described as a seventh conductor. A method for forming the coil 401 is not limited to the above-described example, a coil wound multiple times may be configured by various methods such that pattern directions of at least one first conductor 301a and at least one third conductor 301c and/or directions of magnetic fields generated from the at least one first conductor 301a and the at least one third conductor 301c are opposite to each other.

Referring to FIG. 4A, the coil 401 may be configured such that a part thereof is formed in an XY plane and the other part thereof is formed in a ZX plane. Herein, a part of the coil 401 corresponding to a −Y direction is described as first conductor(s) 401a, a part corresponding to a +Z direction is described as second conductor(s) 401b, and a part corresponding to a +Y direction is described as third conductor(s) 401c. More specifically, the coil 401 configured according to a method for winding the coil 301 of FIG. 3 multiple times may include first conductors 301a corresponding to a −Y direction of the coil 301, second conductors 301b corresponding to a +Z direction of the coil 301, and third conductors 301c corresponding to a +Y direction of the coil 301 in plurality, Therefore, the disclosure describes that the coil 401 wound multiple times includes first conductors 301a, second conductors 301b, and third conductors 301c in plurality, and the first conductors 401a, the second conductors 401b, and the third conductors 401c configure at least a part of the coil 401, It will be apparent to those skilled in the art that the coil 401 wound multiple times may be described in the same manner as the description of the coil 301.

The coil 401 may include at least one hinge portion (e.g. 403a or 403b). The at least one hinge portion (e.g. 403a or 403b) may be made of a bendable material, and the coil 401 may be bent in one direction, since the at least one hinge portion (e.g. 403a or 403b) is bendable. For example, referring to FIG. 4A, the at least one hinge portion (e.g. 403a or 403b) may be included in the vicinity where the second conductors 401b and the first conductors 401a and/or the third conductors 401c are connected, and the second conductors 401b may be bent or unbent toward a −Y direction or a +Y direction. The at least one hinge portion 403a and 403b may be implemented by a flexible material.

The coil 401 may be disposed on a flexible printed circuit board (PCB) inside a housing of a wireless power transmission device 101 together with other components (e.g., an impedance matching circuit and/or an amplifier circuit) of the wireless power transmission device 101, Accordingly, the coil 401 disposed on the flexible PCB may be bent together with the flexible PCB through the at least one hinge portion (e.g. 403a or 403b).

A segment portion 405 configured to divide the second conductors 401b into a plurality of sub-conductors 407a and 407b may be included in a part of the second conductors 401b. For example, the segment portion 405 may be implemented as a slit functioning as a capacitor, as will be described later herein. A segment portion may be included in a part of one of the first conductors 401a and the third conductors 401c, or in two or more of the first conductors 401a, the second conductors 401b, and the third conductors 401c, and the included segment portion may be implemented as a slit functioning as a capacitor. On the basis that the segment portion 405 (e.g., slit) is included in a part of the coil 401, the coil 401 may be used as a resonator including a capacitor and an inductor.

Figure 4B:
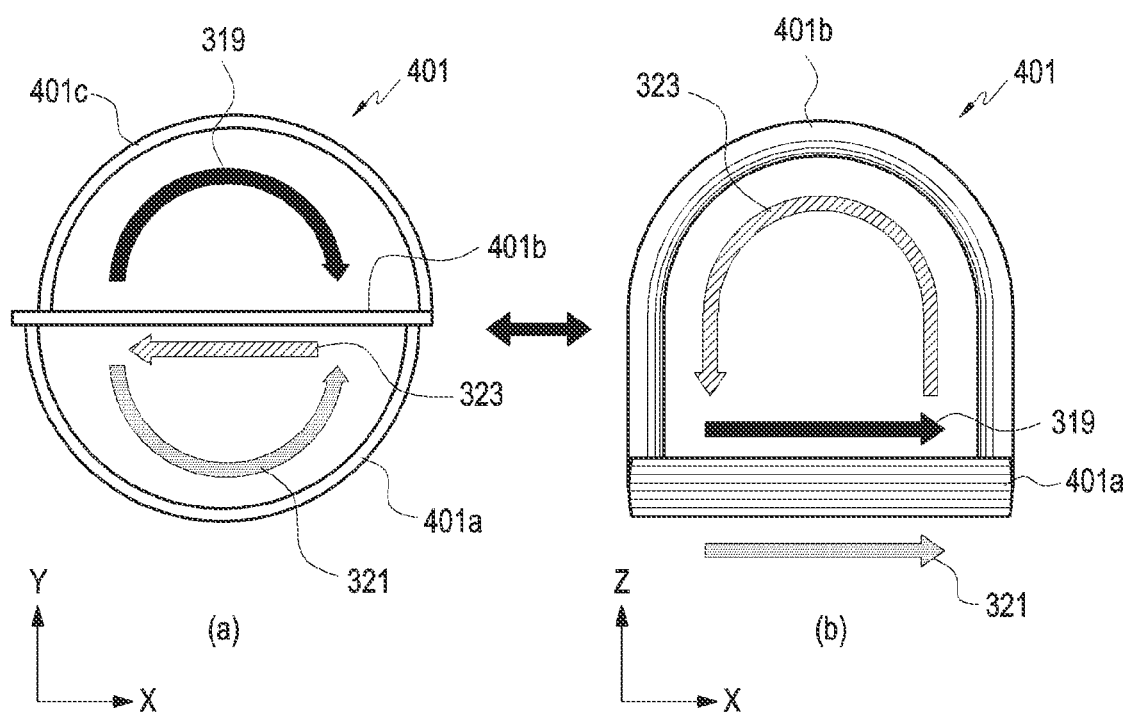
FIG. 4B illustrates directions of alternating current flowing through a coil, according to an embodiment.

FIG. 4B illustrates directions of alternating current flowing through the coil 401, according to an embodiment.

Referring to FIG. 4B, when alternating current flows through the first conductors 401a in a counterclockwise direction and through the second conductors 401b in a counterclockwise direction at a specific time point, a direction 321 of alternating current flowing through the first conductors 401a, a direction 323 of alternating current flowing through the second conductors 401b, and a direction 319 of alternating current flowing through the third conductors 401c are shown. The direction 321 of the current flowing through the first conductors 401a and the direction 319 of the current flowing through the third conductors 401c are identical to 321 and 319 described in section (b) of FIG. 3, and thus, the description thereof is omitted. Hereinafter, it is assumed that alternating current flows through the first conductors 401a in a counterclockwise direction and alternating current flows through the second conductors 401b in a counterclockwise direction.

Referring to section (a) of FIG. 4B, directions of current flowing through the coil 401 when the coil 401 is viewed from a +Z direction are shown, and referring to section (b) of FIG. 4B, directions of current flowing through the coil 401 when the coil 401 is viewed from a −Y direction are shown. Referring also to section (a) of FIG. 3, a pattern of the second conductors 401b may be identical to the pattern of the second conductor 301b. Based on the pattern of the second conductors 401b, as indicated by reference numeral 323, current in a counterclockwise direction may flow on a ZX plane. When alternating current flows through the first conductors 401a in a counterclockwise direction and through the second conductors 401b in a counterclockwise direction, a direction of current flowing through the third conductors 401c may be opposite to an arrow direction of reference numeral 321. Hereinafter, unless otherwise stated, the description is based on a time point in which alternating current flows through the first conductors 401a in a counterclockwise direction and through the second conductors 401b in a counterclockwise direction. Even at a time point in which alternating current flows through the first conductors 401a in a clockwise direction and through the second conductors 401b in a clockwise direction, a description herein similarly applies.

Figure 5:
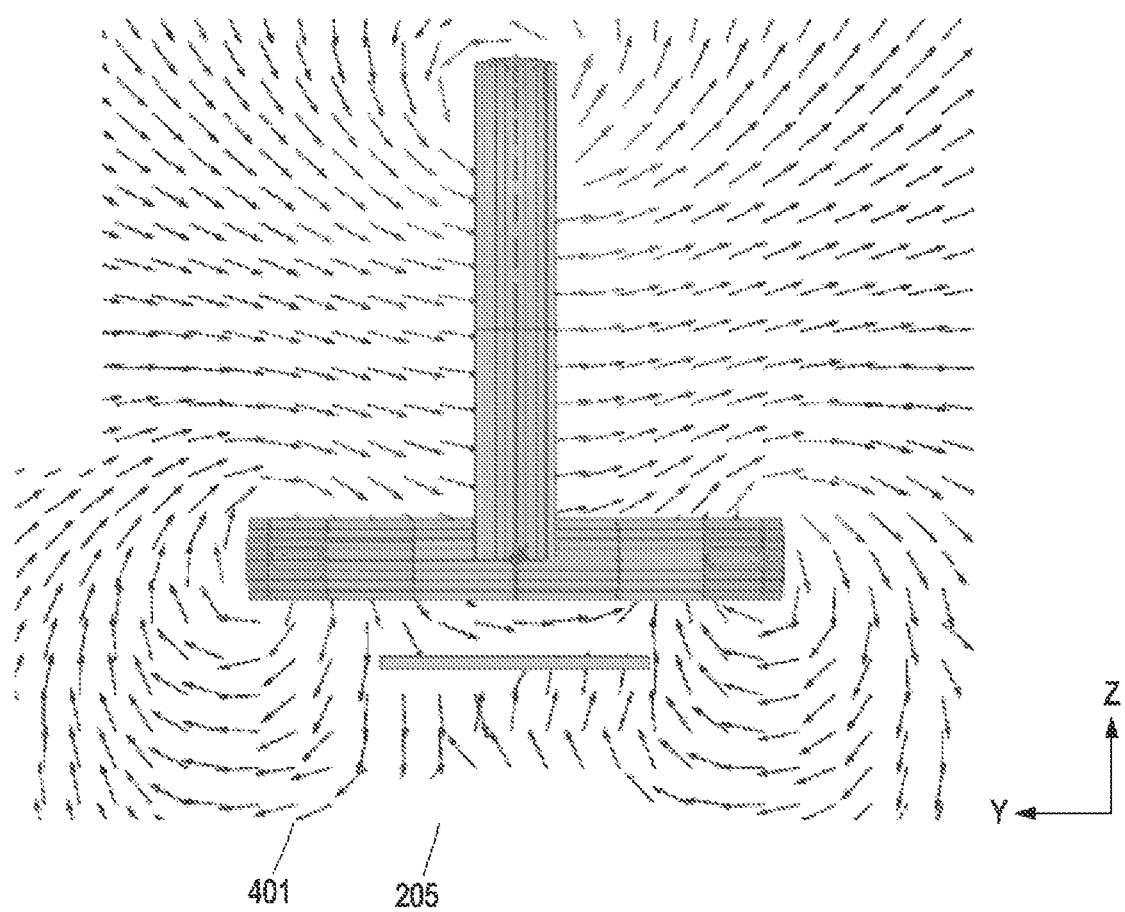
FIG. 5 illustrates a magnetic field generated from a coil, according to an embodiment.

FIG. 5 illustrates a magnetic field generated from the coil 401 according to an embodiment. The magnetic field shown in FIG. 5 may also be described as a magnetic field of the coil 301 of FIG. 3.

As described in FIG. 4B, current in a direction corresponding to reference numeral 321 may flow through the first conductors 401a of the coil 401, current corresponding to reference numeral 323 may flow through the second conductors 401b, and current in a direction corresponding to reference numeral 319 may flow through the third conductors 401c. The arrows shown in FIG. 5 represent magnetic force lines of a magnetic field (e.g., H-field) generated from the coil 401, on the basis that alternating current flows through the coil 401, from a perspective in which the coil 401 is viewed from a -X direction.

As described in FIG. 2B, at least a part of a magnetic field generated from the coil 401 passes through a conductor such as the metal material 205, and eddy current is induced in the metal material 205. Accordingly, an inductance of the coil 401, a resonant frequency of a resonant circuit including the coil 401, and/or a Q factor of the resonant circuit including the coil 401 may be changed.

Referring also to FIG. 2B, it is evident that the number of magnetic force lines passing through the metal material 205 among the magnetic force lines of the magnetic field generated from the coil 401 is less than the number of magnetic force lines passing through the metal material 205 among the magnetic force lines of the magnetic field generated from the resonant circuit 201. This is because magnetic fields are generated in opposite directions at a lower side (e.g., the first conductors 401a and the third conductors 401c) of the coil 401, and thus the strength of the magnetic field toward the metal material 205 positioned in a -Z direction with respect to the coil 401 is less than the strength of the magnetic field from the resonant circuit 201 toward the -Z direction. As such, the coil 401 is configured such that the strength of the magnetic field toward the -Z direction from the lower side surface (e.g., the first conductors 401a and the third conductors 401c) is small, so that the degree to which the inductance of the coil 401, the resonant frequency of the resonant circuit including the coil 401, and/or the Q factor of the resonant circuit including the coil 401 are changed when the metal material 205 is positioned around the coil may be reduced. This will be described in more detail later herein.

Figure 6:
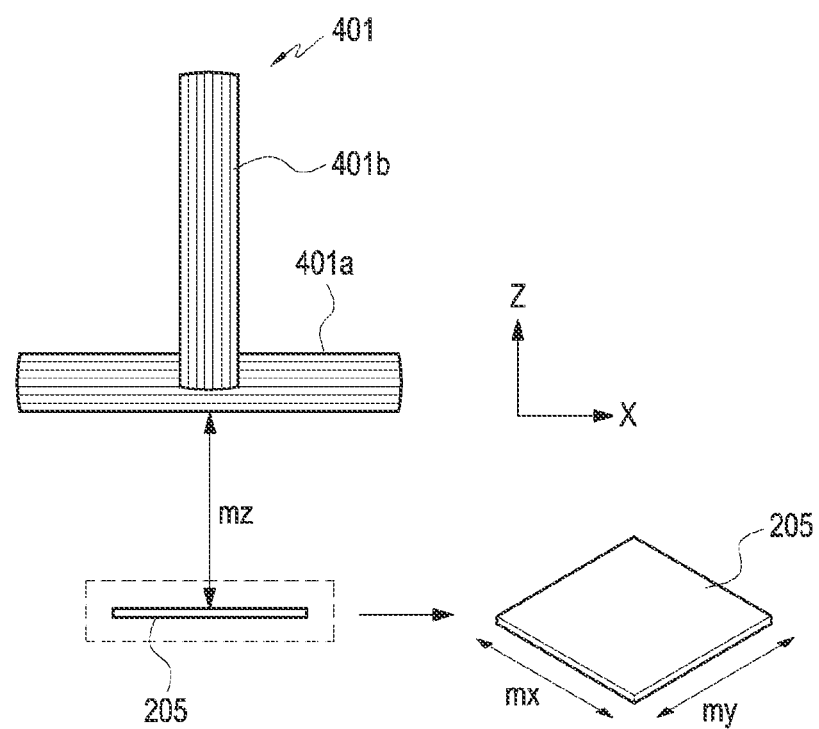
FIG. 6 illustrates a change in characteristics of a coil when a metal material is positioned around the coil, according to an embodiment.

FIG. 6 illustrates a change in characteristics of the coil 401 when the metal material 205 is positioned around the coil 401, according to an embodiment.

For convenience of description, it is assumed that the metal material 205 has a rectangular shape having a length nix in an x-axis direction and a length my in a y-axis direction. The mz shown in FIG. 6 represents a distance in a z-axis direction between the coil 401 (e.g., a lower side surface) and the metal material 205 (e.g., an upper side surface).

For example, when the metal material 205 with mx=10 mm and my=10 mm is positioned at a point with mz=20 mm, a simulation result for changes in the measured equivalent inductance L of the coil 401, resonant frequency $f_r$ of the resonant circuit including the coil 401, and Q factor of the resonant circuit including the coil 401 are shown above in Table 3. When the metal material 205 is not positioned, it is assumed that the resonant frequency of the resonant circuit including the coil 401 is 6.78 MHz and the Q factor thereof is 1300. Table 4 appears as follows.

TABLE 4

|  | Inductance change (ΔL) | Q factor change (ΔQ) |
|---|---|---|
| Degree of change (In case of resonant circuit 201) | −5.653 [%] | −1213 |
| Degree of change (In case of coil 401) | −0.10 [%] | −327.89 |

Referring to Table 4, it is evident that the degree to which the inductance L and the Q factor are changed when the metal material 205 is positioned around the resonant circuit including the coil 401 is less than the degree to which the inductance L and the Q factor are changed when the metal material 205 is positioned around the resonant circuit 201. In other words, the coil 401 is configured such that the strength of the magnetic field toward the -Z direction from the lower side surface (e.g., the first conductors 401a and the third conductors 401c) of the coil 401 is small, so that the degree to which the inductance of the coil 401, the resonant frequency of the resonant circuit including the coil 401, and/or the Q factor of the resonant circuit including the coil 401 are changed when the metal material 205 is positioned around the coil may be reduced.

Figure 7A:
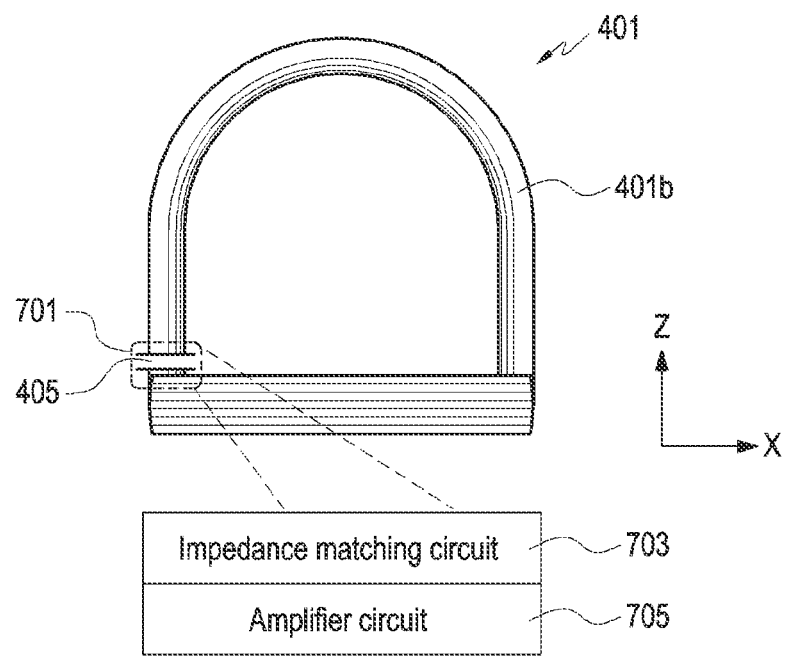
FIG. 7A illustrates an example of components of a resonant circuit and a wireless power transmission device including the coil, according to an embodiment.

FIG. 7A illustrates an example of components of a resonant circuit and a wireless power transmission device including the coil, according to an embodiment.

The coil 401 may include the segment portion 405. For example, as shown in FIG. 7A, the segment portion 405 (e.g., slit) may be included in a part of the second conductors 401b of the coil 401. The segment portion 405 (e.g., slit) may function as a capacitor 701 having a capacitance value that is proportional to an area of the segment portion 405 and inversely proportional to a gap of the segment portion 405. At least one capacitor may be connected to both ends at which the segment portion 405 is configured. The coil 401 may be used as a resonant circuit, based on including the segment portion 405 functioning as a capacitor. When alternating current is supplied to the both ends at which the segment portion 405 is configured, a high frequency wave may be transmitted through the surface of the coil 401. The components of the wireless power transmission device 101 may be electrically connected to the both ends at which the segment portion 405 is configured. For example, an impedance matching circuit 703 may be connected to the both ends at which the segment portion 405 is configured. The wireless power transmission device 101 may amplify power to be transmitted through an amplifier circuit 705, and then provide the amplified power to the coil 401 (e.g., resonant circuit) including the segment portion 405 through the impedance matching circuit 703. Based on the current supplied from the impedance matching circuit 703, a magnetic field may be generated from the coil 401 (e.g., resonant circuit) including the segment portion 405, and accordingly, power may be wirelessly transmitted to a wireless power reception device.

Figure 7B:
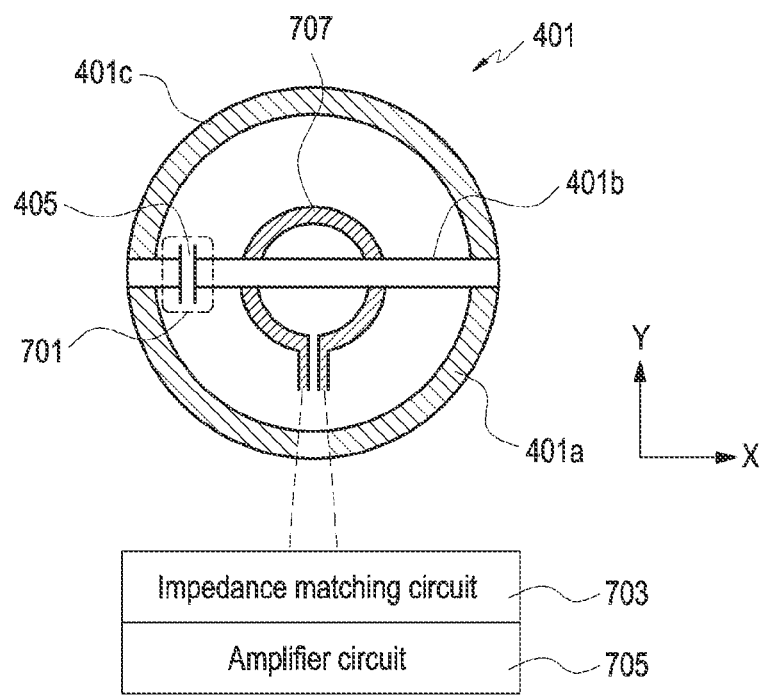
FIG. 7B illustrates an example of components of a resonant circuit and a wireless power transmission device including the coil, according to an embodiment.

FIG. 7B illustrates an example of components of a resonant circuit and a wireless power transmission device including the coil, according to an embodiment.

Figure 8:
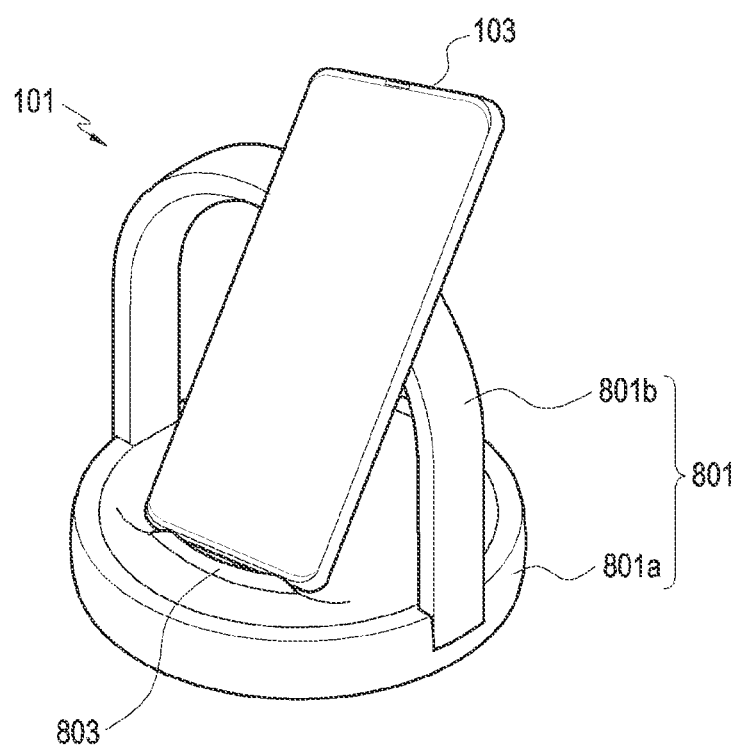
FIG. 8 illustrates an example of a wireless power transmission device, according to an embodiment.

The coil 401 may include the segment portion 405. For example, as shown in FIG. 7B, the segment portion 405 (e.g., slit) may be included in a part of the second conductors 401b of the coil 401. The segment portion 405 (e.g., slit) may function as the capacitor 701 having a capacitance value. A capacitance value of the segment portion 405 may be proportional to an area of the segment portion 405 and inversely proportional to a gap of the segment portion 405. At least one capacitor may be connected to both ends at which the segment portion 405 is configured. The coil 401 may be used as a resonant circuit, based on including the segment portion 405 functioning as a capacitor. The wireless power transmission device 101 may include a feeding coil (in other words, a feeding loop) 707. The feeding coil 707 may be electromagnetically coupled to the coil 401 (e.g., resonant circuit) including the segment portion 405. The wireless power transmission device 101 may amplify power to be transmitted through the amplifier circuit 705, and then provide the amplified power to the feeding coil 707 through the impedance matching circuit 703. Based on the current supplied to the feeding coil 707, a magnetic field may be generated from the feeding coil 707, and an induced electromotive force and an induced current may be generated in the coil 401 (e.g., resonant circuit) including the segment portion 405 electromagnetically connected to the feeding coil 707. Based on the induced electromotive force and the induced current generated in the coil 401 (e.g., resonant circuit) including the segment portion 405, a magnetic field may be generated from the coil 401 (e.g., resonant circuit) including the segment portion 405, and accordingly, power may be wirelessly transmitted to a wireless power reception device, FIG. 8 illustrates an example of the wireless power transmission device 101, according to an embodiment.

The wireless power transmission device 101 may include a coil (e.g., the coil 301 of FIG. 3 and/or the coil 401 of FIG. 4A), and a housing 801 in the form of enclosing the coil (e.g., the coil 301 of FIG. 3 and/or the coil 401 of FIG. 4A).

The housing 801 may be implemented to correspond to the shape of the coil (e.g., the coil 301 of FIG. 3 and/or the coil 401 of FIG. 4A). For example, as shown in FIG. 8, the housing may include a lower housing 801a corresponding to the shape of a first conductor (e.g., the first conductor 301a of FIG. 3 or the first conductors 401a of FIG. 4A) and a third conductor (e.g., the third conductor 301c of FIG. 3 or the third conductors 401c of FIG. 4A), and an upper housing 801b corresponding to the shape of a second conductor (e.g., the second conductor 301b of FIG. 3 or the second conductors 401b of FIG. 4A).

At least one component (e.g., an impedance matching circuit and/or an amplifier circuit) of the wireless power transmission device may be included in the lower housing 801a. For example, the at least one component of the wireless power transmission device 101 may be included in the lower housing 801a so as to be positioned under the first conductor (e.g., the first conductor 301a of FIG. 3 or the first conductors 401a of FIG. 4A) and the third conductor (e.g., the third conductor 301c of FIG. 3 or the third conductors 401c of FIG. 4A). The at least one component of the wireless power transmission device 101 may include a metal material, and is positioned under (e.g., a position in a –Z direction) the first conductor (e.g., the first conductor 301a of FIG. 3 or the first conductors 401a of FIG. 4A) and the third conductor (e.g., the third conductor 301c of FIG. 3 or the third conductors 401c of FIG. 4A), so that the characteristics of the coil (e.g., the coil 301 of FIG. 3 and/or the coil 401 of FIG. 4A) (or a resonant circuit including a coil) are less affected.

The wireless power reception device 103 may be seated in the upper housing 801b and the lower housing 801a. For example, as shown in FIG. 8, the wireless power reception device 103 is inclined at a predetermined angle, and a lower portion of the wireless power reception device 103 may be disposed on the lower housing 801a, and an upper portion thereof may be disposed to lean on the upper housing. 80 lb. The lower housing 801a may include a fixing means 803 so as to allow the wireless power reception device 103 to be securely fixed to the housing 801 (e.g., not to slip) when seated in an inclined state.

The wireless power reception device 103 may wirelessly receive power 105 from the wireless power transmission device 101, based on a magnetic field generated from the coil 301, 401.

In addition to the wireless power reception device 103 seated in the housing 801, at least one wireless power reception device positioned around the wireless power transmission device 101 may also wirelessly receive the power 105 from the wireless power transmission device 101. For example, the at least one wireless power reception device may be positioned in a lateral direction and/or an upper direction of the wireless power transmission device 101. Based on a magnetic field generated from the coil (e.g., the coil 301 of FIG. 3 and/or the coil 401 of FIG. 4A), the power 105 may be transmitted from the wireless power transmission device 101 to the at least one wireless power reception device.

As described above, a coil (e.g., the coil 301 of FIG. 3 or the coil 401 of FIG. 4A) may include a first conductor (e.g., the first conductor 301a of FIG. 3 or the first conductors 401a of FIG. 4A) disposed on a first plane, a second conductor (e.g., the second conductor 301b of FIG. 3 or the second conductors 401b of FIG. 4A) disposed on a second plane different from the first plane, and including a first end (e.g., 305 of FIG. 3) electrically connected to first end (e.g., 303 of FIG. 3) of the first conductor, and a second end (e.g., 307 of FIG. 3) positioned near an second end (e.g., 315 of FIG. 3) of the first conductor, and a third conductor (e.g., the third conductor 301c of FIG. 3 or the second conductors 401c of FIG. 4A) disposed on the first plane, and including first end (e.g., 309 of FIG. 3) electrically connected to the second end (e.g., 307 of FIG. 3) of the second conductor, and an second end (e.g., 311 of FIG. 3) positioned near the first end of the second conductor, wherein a pattern of the first conductor connecting the first end of the first conductor from the second end of the first conductor is in a clockwise or counterclockwise direction when the first plane is viewed from one side, and a pattern of the third conductor connecting the second end of the third conductor from the first end of the third conductor is in a direction opposite to the direction of the pattern of the first conductor when the first plane is viewed from the one side.

The coil may include a segment portion (e.g., the segment portion 405 of FIG. 4A) configured to divide at least one of the first conductor, the second conductor, or the third conductor into a first sub-conductor and a second sub-conductor (e.g., the sub-conductors 407a and 407b of FIG. 4A), and the segment portion may have a capacitance value.

The first conductor may be configured to generate a first magnetic field in a first direction with respect to an inner side of the first conductor and the third conductor, and the third conductor may be configured to generate a second magnetic field in a second direction opposite to the first direction with respect to the inner side.

The coil may include a coil wound multiple times including a fourth conductor (e.g., a pattern formed from the third end 313 to the fourth end 317 in FIG. 4A) extending from the second end of the third conductor in a pattern direction of the second conductor, a fifth conductor (e.g., a pattern formed by extending in the pattern direction of the first conductor 301a in FIG. 4A) extending from first end of the fourth conductor in a pattern direction of the first conductor, a sixth conductor (e.g., a pattern formed by extending in the pattern direction of the second conductor 301b in the vicinity of the first end 305 of the second conductor 301b and/or the first end 303 of the first conductor 301a in FIG. 4A) extending from first end of the fifth conductor in the pattern direction of the second conductor, and a seventh conductor (e.g., a pattern formed by extending in the pattern direction of the third conductor 301c in the vicinity of the second end 307 of the second conductor 301b and/or the first end 309 of the third conductor 301c in FIG. 4A) extending from first end of the sixth conductor in the pattern direction of the third conductor.

At least one of the first conductor, the second conductor, or the third conductor may be configured to include a shape spaced a specified distance apart from a center of the inner side of the first conductor and the third conductor.

At least one of the first conductor or the third conductor may be configured to include a semicircular shape having a specified curvature, and the second conductor may be configured to include a semicircular shape or an arch shape.

The first conductor and the third conductor may be configured to include a shape symmetrical to each other.

The first conductor and the third conductor may include a hinge portion (e.g., the hinge portion (e.g. 403a or 403b) of FIG. 4A), at least a part of which is made of a flexible material.

As described above, a coil may include a first conductor disposed on a first plane, a second conductor disposed on a second plane different from the first plane, and including a first end electrically connected to first end of the first conductor, and a second end positioned near an second end of the first conductor, and a third conductor disposed on the first plane, and including first end electrically connected to the second end of the second conductor, and an second end positioned near the first end of the second conductor, wherein the first conductor is configured to generate a first magnetic field in a first direction with respect to an inner side of the first conductor and the third conductor, the second conductor is configured to generate a second magnetic field in a third direction different from a second direction opposite to the first direction and the first direction, with respect to the inner side, and the third conductor is configured to generate a third magnetic field in the second direction with respect to the inner side.

The coil may include a segment portion configured to divide at least one of the first conductor, the second conductor, or the third conductor into a plurality of sub-conductors, and the segment portion may have a capacitance value.

The coil may include a coil wound multiple times including a fourth conductor extending from the first end of the third conductor in a pattern direction of the second conductor, a fifth conductor extending from first end of the fourth conductor in a pattern direction of the first conductor, a sixth conductor extending from first end of the fifth conductor in the pattern direction of the second conductor, and a seventh conductor extending from first end of the sixth conductor in the pattern direction of the third conductor.

At least one of the first conductor, the second conductor, or the third conductor may be configured to include a shape spaced a specified distance apart from a center of the inner side of the first conductor and the third conductor.

At least one of the first conductor or the third conductor may be configured to include a semicircular shape having a specified curvature, and the second conductor may be configured to include a semicircular shape or an arch shape.

The first conductor and the third conductor may be configured to include a shape symmetrical to each other.

The first conductor and the third conductor may include a hinge portion, at least a part of which is made of a flexible material.

As described above, a resonant circuit may include a coil and at least one capacitor, wherein the coil includes a first conductor disposed on a first plane, a second conductor disposed on a second plane different from the first plane, and including a first end electrically connected to first end of the first conductor, and a second end positioned near an second end of the first conductor, and a third conductor disposed on the first plane, and including first end electrically connected to the second end of the second conductor, and an second end positioned near the first end of the second conductor, a pattern of the first conductor connecting the first end of the first conductor from the second end of the first conductor includes a pattern in a clockwise or counterclockwise direction when the first plane is viewed from a first side a pattern of at least one third conductor connecting the second end of the third conductor from the first end of the third conductor includes a pattern in a direction opposite to the pattern of the first conductor when the first plane is viewed from the one side, and the at least one capacitor is connected to at least one of the first conductor, the second conductor, or the third conductor.

The coil may include a coil wound multiple times and including a fourth conductor extending from the second end of the third conductor in a pattern direction of the second conductor, a fifth conductor extending from first end of the fourth conductor in a pattern direction of the first conductor, a sixth conductor extending from first end of the fifth conductor in the pattern direction of the second conductor, and a seventh conductor extending from first end of the sixth conductor in a pattern direction of the third conductor.

At least one of the first conductor, the second conductor, or the third conductor may be configured to include a shape spaced a specified distance apart from a center of an inner side of the first conductor and the third conductor.

At least one of the first conductor or the third conductor may be configured to include a semicircular shape having a specified curvature, and the second conductor may be configured to include a semicircular shape or an arch shape.

The first conductor and the third conductor may include a hinge portion (e.g., the hinge portion (e.g. 403a or 403b) of FIG. 4A), at least a part of which is made of a flexible material.

As used in connection with various embodiments of the disclosure, the term "module" may include a unit implemented in hardware, software, or firmware, and may interchangeably be used with other terms such as "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the wireless power transmission device 101), For example, a processor of the machine (e.g., the wireless power transmission device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium, Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed. (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A coil comprising:
   a first conductor disposed on a first plane and having a first end and a second end;
   a second conductor having a third end and a fourth end and being disposed on a second plane different from the first plane, the third end of the second conductor being electrically connected to the first end of the first conductor, and the fourth end of the second conductor being positioned near the second end of the first conductor;
   a third conductor having a fifth end and a sixth end and being disposed on the first plane, the fifth end of the third conductor being electrically connected to the fourth end of the second conductor, and the sixth end of the third conductor being positioned near the third end of the second conductor; and
   a segment portion implemented as a slit and configured to divide at least one of the first conductor, the second conductor, or the third conductor into a first sub-conductor and a second sub-conductor,
   wherein the segment portion has a capacitance value, and the at least one of the first conductor, the second conductor, or the third conductor and the segment portion are used as a resonator,
   wherein a current flows from the first end of the first conductor to the second end of the first conductor in a first direction including a clockwise direction or a counterclockwise direction, and
   wherein another current flows from the sixth end of the third conductor to the fifth end of the third conductor in a second direction opposite to the first direction.

2. The coil of claim 1,
   wherein the first conductor is configured to generate a first magnetic field in a third direction with respect to an inner side of the first conductor and the third conductor, and
   wherein the third conductor is configured to generate a second magnetic field in a fourth direction opposite to the third direction with respect to the inner side.

3. The coil of claim 1, further comprising a coil wound multiple times and including a fourth conductor extending from the sixth end of the third conductor in a pattern direction of the second conductor, a fifth conductor extending from a seventh end of the fourth conductor in a pattern direction of the first conductor, a sixth conductor extending from an eighth end of the fifth conductor in the pattern direction of the second conductor, and a seventh conductor extending from a ninth end of the sixth conductor in the pattern direction of the third conductor.

4. The coil of claim 1,
   wherein at least one of the first conductor, the second conductor, or the third conductor is configured to include a shape spaced a specified distance apart from a center of an inner side of the first conductor and the third conductor.

5. The coil of claim 4,
   wherein at least one of the first conductor or the third conductor is configured to include a semicircular shape having a specified curvature, and
   wherein the second conductor is configured to include a semicircular shape or an arch shape.

6. The coil of claim 4,
   wherein the first conductor and the third conductor are configured to include a shape symmetrical to each other.

7. The coil of claim 1,
   wherein the first conductor and the third conductor comprise a hinge portion having at least a part that is made of a flexible material.

8. A coil comprising:
   a first conductor disposed on a first plane;
   a second conductor disposed on a second plane different from the first plane, and electrically connected to the first conductor;
   a third conductor disposed on the first plane, and electrically connected to the first conductor and the second conductor, and
   a segment portion implemented as a slit and configured to divide at least one of the first conductor, the second conductor, or the third conductor into a first sub-conductor and a second sub-conductor,
   wherein the segment portion has a capacitance value, and the at least one of the first conductor, the second conductor, or the third conductor and the segment portion are used as a resonator,
   wherein the first conductor is configured to generate a first magnetic field in a first direction with respect to an inner side of the first conductor and the third conductor,
   wherein the second conductor is configured to generate a second magnetic field in a third direction different from a second direction opposite to the first direction and the first direction, with respect to the inner side, and
   wherein the third conductor is configured to generate a third magnetic field in the second direction with respect to the inner side.

9. The coil of claim 8, further comprising a coil wound multiple times and including a fourth conductor extending from a first end of the third conductor in a pattern direction of the second conductor, a fifth conductor extending from a first end of the fourth conductor in a pattern direction of the first conductor, a sixth conductor extending from a first end of the fifth conductor in the pattern direction of the second conductor, and a seventh conductor extending from a first end of the sixth conductor in the pattern direction of the third conductor.

10. The coil of claim 8,
wherein at least one of the first conductor, the second conductor, or the third conductor is configured to include a shape spaced a specified distance apart from a center of the inner side.

11. The coil of claim 10,
wherein at least one of the first conductor or the third conductor is configured to include a semicircular shape having a specified curvature, and
wherein the second conductor is configured to include a semicircular shape or an arch shape.

12. The coil of claim 10,
wherein the first conductor and the third conductor are configured to include a shape symmetrical to each other.

13. The coil of claim 8,
wherein the first conductor and the third conductor comprise a hinge portion having at least a part that is made of a flexible material.

14. A resonant circuit comprising:
a coil; and
at least one capacitor;
wherein the coil comprises:
  a first conductor having a first end and a second end and being disposed on a first plane;
  a second conductor having a third end and a fourth end and being disposed on a second plane different from the first plane, the third end of the second conductor being electrically connected to the first end of the first conductor, and the fourth end of the second conductor being positioned near the second end of the first conductor;
  a third conductor having a fifth end and a sixth end and being disposed on the first plane, the fifth end of the third conductor being electrically connected to the fourth end of the second conductor, and the sixth end of the third conductor being positioned near the third end of the second conductor; and
  a segment portion implemented as a slit and configured to divide at least one of the first conductor, the second conductor, or the third conductor into a first sub-conductor and a second sub-conductor,
wherein the segment portion has a capacitance value, and the at least one of the first conductor, the second conductor, or the third conductor and the segment portion are used as a resonator,
wherein a current flows from the first end of the first conductor to the second end of the first conductor in a first direction including a clockwise direction or a counterclockwise direction,
wherein another current flows from the sixth end of the third conductor to the fifth end of the third conductor in a second direction opposite to the first direction, and
wherein the at least one capacitor is connected to at least one of the first conductor, the second conductor, or the third conductor.

15. The resonant circuit of claim 14,
wherein the coil further comprises a coil wound multiple times and including a fourth conductor extending from the sixth end of the third conductor in a pattern direction of the second conductor, a fifth conductor extending from a seventh end of the fourth conductor in a pattern direction of the first conductor, a sixth conductor extending from an eighth end of the fifth conductor in the pattern direction of the second conductor, and a seventh conductor extending from a ninth end of the sixth conductor in a pattern direction of the third conductor.

16. The resonant circuit of claim 14,
wherein at least one of the first conductor, the second conductor, or the third conductor is configured to include a shape spaced a specified distance apart from a center of an inner side of the first conductor and the third conductor.

17. The resonant circuit of claim 14,
wherein at least one of the first conductor or the third conductor is configured to include a semicircular shape having a specified curvature, and the second conductor is configured to include a semicircular shape or an arch shape.

18. The resonant circuit of claim 14,
wherein the first conductor and the third conductor comprise a hinge portion having at least a part that is made of a flexible material.

* * * * *